United States Patent

Guttinger et al.

Patent Number: 5,127,514
Date of Patent: Jul. 7, 1992

[54] VARIABLE WIDTH CONVEYOR BUCKET

[76] Inventors: Peter Guttinger, 862 Cabot Trail, Milton, Ontario, Canada, L9T 3S8; Stefan Mirek, #202, 3 Heatherdale Road, Toronto, Ontario, Canada, M8Y 1S9

[21] Appl. No.: 757,277

[22] Filed: Sep. 10, 1991

[51] Int. Cl.⁵ .............................. B65G 17/34
[52] U.S. Cl. ................ 198/803.11; 198/473.1; 198/803.01; 198/803.14
[58] Field of Search ............ 198/708, 710, 473.1, 198/731, 803.01, 803.11, 803.14

[56] References Cited

U.S. PATENT DOCUMENTS

| | | | |
|---|---|---|---|
| 1,944,374 | 1/1934 | Schmidtke | 198/731 |
| 2,358,292 | 9/1944 | Malhiot | 198/803.11 |
| 4,787,505 | 11/1988 | Tweedy | 198/803.11 X |

FOREIGN PATENT DOCUMENTS 0252041 11/1947 Switzerland ............ 198/803.11

Primary Examiner—Joseph E. Valenza
Assistant Examiner—Tuan N. Nguyen
Attorney, Agent, or Firm—Fetherstonhaugh & Co.

[57] ABSTRACT

There is shown a conveyor bucket having a base member which is mounted on a structure connecting it to a pair of conveyor chains, the base member has an upstanding fixed wall and a second wall movable on the base relative to the first wall to vary the distance between first and second walls whereby to vary the width of the bucket to accomodate different size articles to be conveyed. A serrated section is provided on the upper face of the base member and a correspondingly serrated mating section is provided on the underface of the second wall member. A spring loaded locking means releasably retains the serrated sections in interlocking engagement at a desired bucket width.

9 Claims, 2 Drawing Sheets

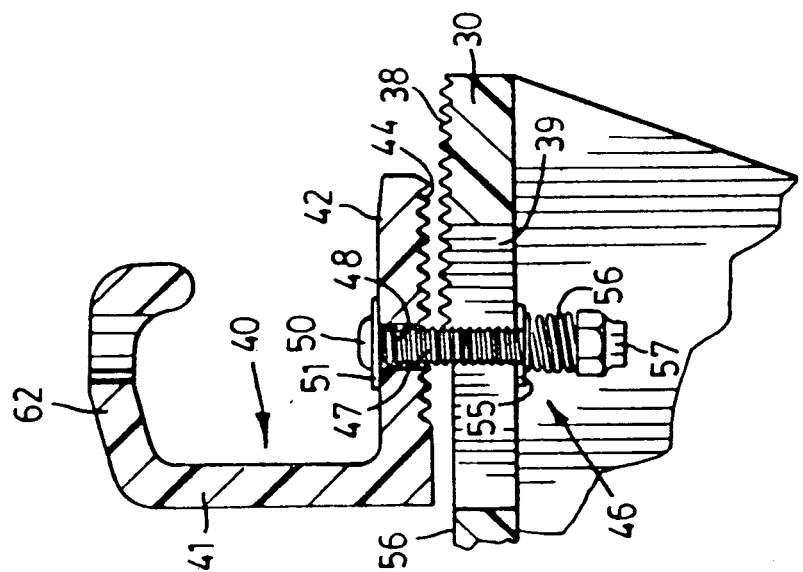
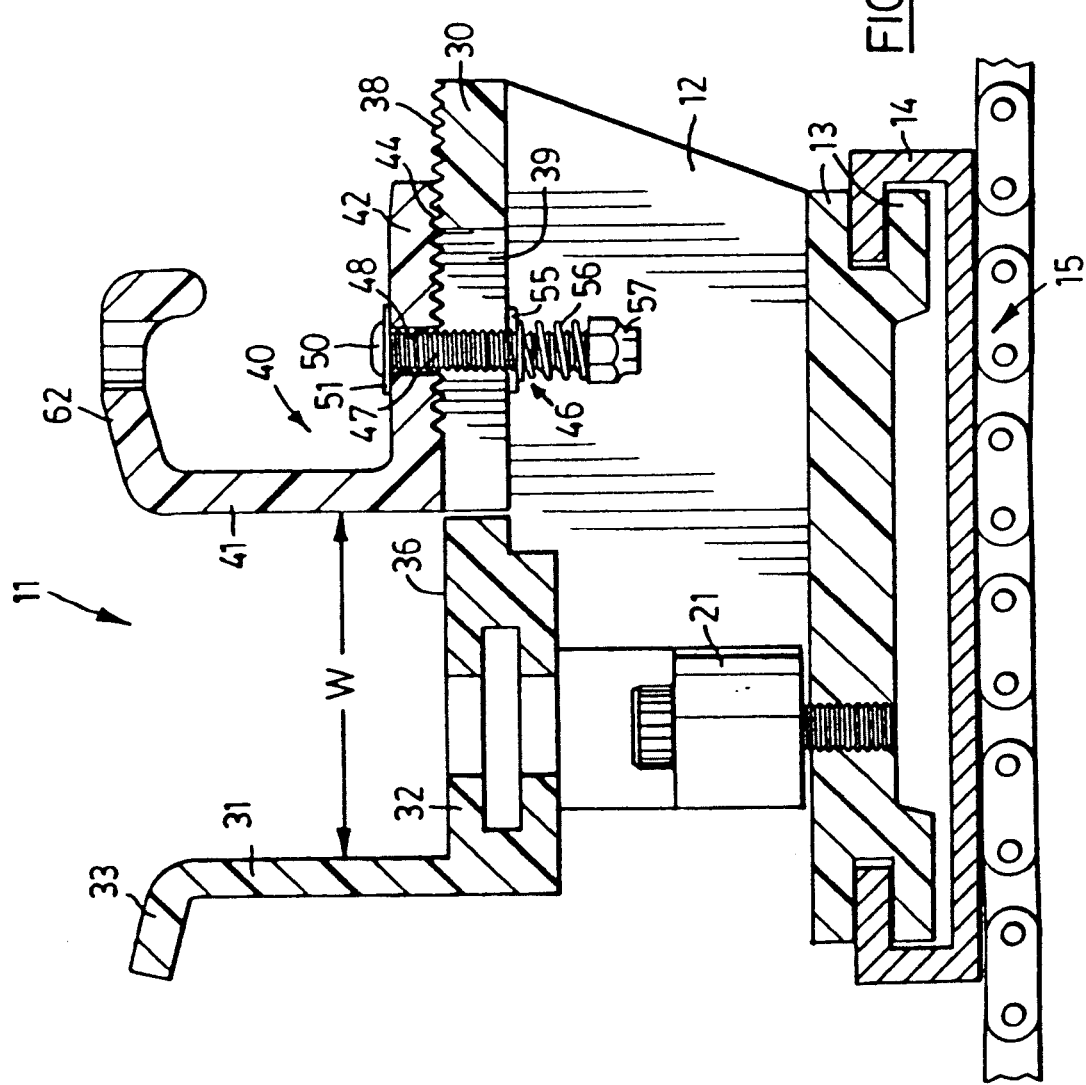

VARIABLE WIDTH CONVEYOR BUCKET

The present invention relates to conveyor buckets the width of which can be varied to accommodate different size articles for conveying.

BACKGROUND OF THE INVENTION

There are available at the present time article conveying buckets for use in a bucket conveyor system in which the bucket is formed by upstanding first and second walls. The distance of the second wall from the first wall can be varied by undoing a number of bolts to detach the second wall from the conveyor bucket base to the extent that it can be repositioned on the bucket base at the desired bucket width. Whilst this has enabled bucket systems to be versatile in the range of articles to be conveyed, it has been a time consuming operation to readjust the bucket widths throughout the conveyor chain and consequently there is a considerable amount of downtime in the operation of the conveyor when the width between bucket walls has to be adjusted to change from one width of article being conveyed to a second width of article.

SUMMARY OF THE INVENTION

The present invention seeks to simplify the act of altering the width of the conveyor bucket thereby reducing the downtime involved in making changes.

According to the present invention there is provided in a conveyor bucket having a base member, a first wall member upstanding of said base member and a second wall member movable on the base member, relative to the first wall member, to vary the distance between first and second wall members, whereby to vary the width of the bucket, the improvement comprising a serrated section on an upper face of the base member; a correspondingly serrated mating section on an undersurface of said second wall member, and a spring loaded locking means for releasably retaining the serrated sections in interlocking engagement at a desired bucket width.

According to a preferred feature of the invention the base member is slotted in the vicinity of its serrated section, the locking means comprising means protruding underneath the second wall member into the slot and spring loaded base member engaging means for clamping the protruding means to the base member.

According to one preferred feature of the invention the protruding means may comprise a rod extending from the second wall member and through the slot and carrying a clamping bar extending across the underside of the slot, and spring means for urging the clamping bar into engagement with an underface of the base, to clamp the second wall member thereto.

According to one preferred feature of the invention the second wall means is of substantially 'L'-shaped configuration, the upstanding web of which forms a wall of the bucket and the flange of which carries the serrated section on its underface.

In a preferred feature of the invention a rod extends from the underface of the flange of the 'L'-shaped second wall and through the slot, a clamping bar being retained on the rod by means of a nut threaded on the outer end of the rod.

According to a further preferred feature of the invention, measuring indicia are provided on the upper face of the base member and a cooperating pointer means is provided on the flange, whereby to provide a visual representation of bucket width.

BRIEF DESCRIPTION OF THE DRAWINGS

The following is description by way of example of one embodiment of the present invention, reference being had to the accompanying drawings in which:

FIG. 2 is a cross-sectional side elevation taken on the line 2—2 of FIG. 1; and

FIG. 3 is a detail of the device in FIG. 2 showing the second wall disengaged for a bucket width varying operation.

DESCRIPTION OF A PREFERRED EMBODIMENT

Figure 1:
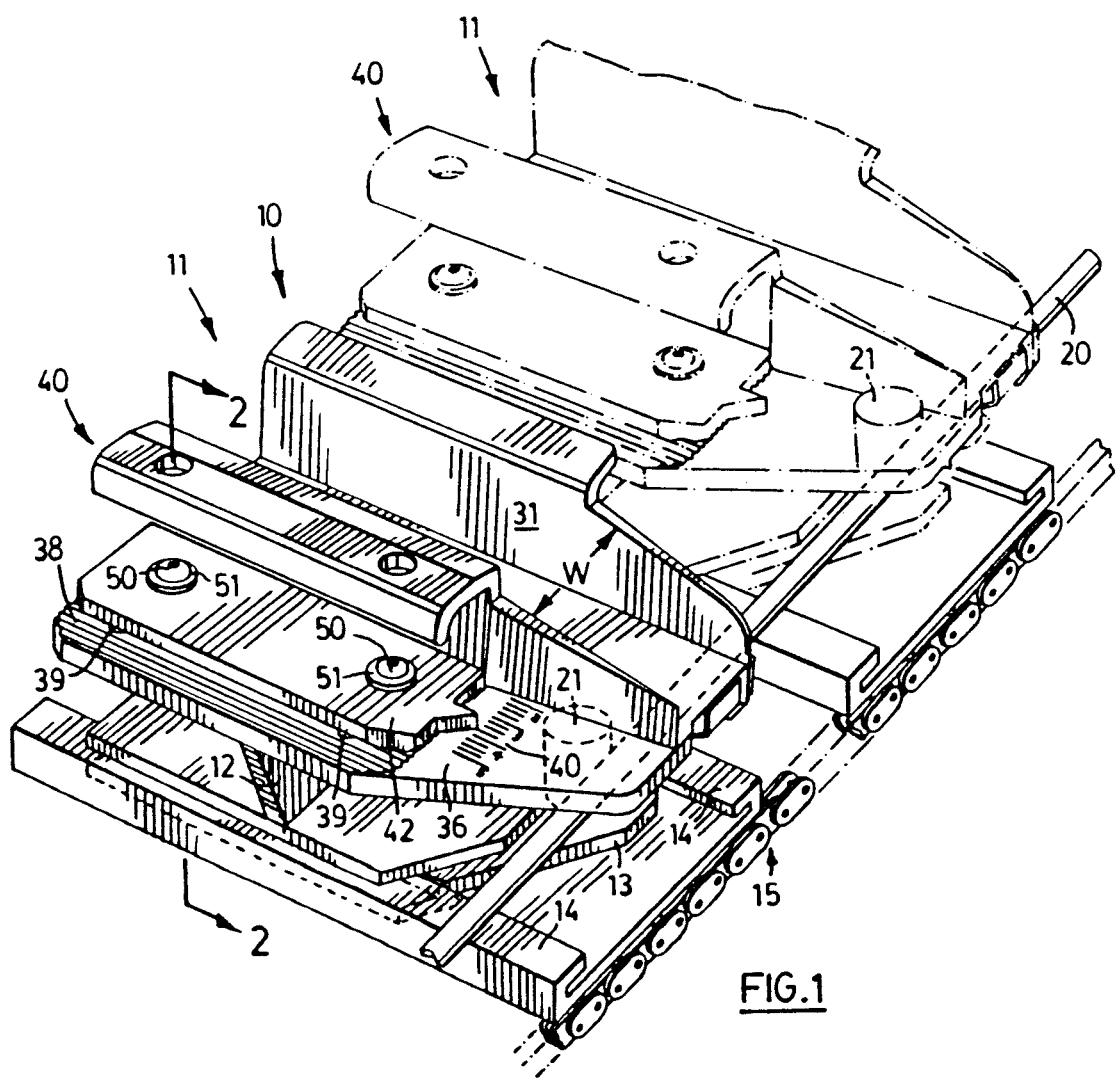
FIG. 1 is a perspective view of a portion of a conveyor line showing a pair of conveyor buckets in side-by-side relationship.

Referring now to the drawings. In FIG. 1 there is shown a conveyor 10 of generally standard configuration in which buckets 11 have upstanding frames 12 terminating in outwarding directed sliding guideways 13 which slidingly connect the buckets 11 to chain engaging members 14 mounted on the chains 15 of the conveyor. The conveyor chains 15 move the conveyor 10 up along a general path and the individual buckets are guided transversely on the chain engaging members 14 by guide rods, or cables 20, on either side of the conveyor. Only one guide 20 is shown in FIG. 1 for the sake of clarity although it will be understood that a corresponding guide rod, or cable will be positioned at the other side of the conveyor. The guide cables 20 are engaged by rollers 21 on each side of the frames 12 (again only those rollers 21 shown on the right hand side of FIG. 1 being visible) and thus the buckets follow the path defined by the guide cables 20 to move them transversely on the engaging members 14 into, for example, a loading station and thereafter out of the loading station again. All of this is standard in the art.

On top of each frame 12 of each bucket 11 there is provided a base member 30 having, in the configuration illustrated, a fixed first wall 31 upstanding from an extended portion 32 of the base member 30. The first wall 31 is preferably provided with a lip 33. On the upper face 36 of the base member 30 there is a serrated section 38. A pair of a parallel slots 39 are provided in the serrated section and extend longitudinally of the conveyor to a sufficient distance to permit the required range of bucket width variation.

A second, or movable, wall member 40 of generally 'L'-shaped configuration (see particularly FIGS. 2 and 3) has an upstanding web 41 which forms a wall of the bucket and a flange 42 which is provided with serrations 44 on its undersurface. The serrations 44 and the serrations 38 are made of corresponding dimensions so that they mate with each other. A spring loaded locking means 46 clamps the second wall member, by means of the serrations 44 on its flange 42 to the serrated section 38 on the base 30. The locking means, in the embodiment shown, is a pair of threaded protrusive bolts or rods 47 which are held in holes 48 in the flange 42. A head 50 and washer 51 keeps each of the rods 47 from falling through the holes 48. A clamping bar 55 extends transversely of the underside of the base 30 spanning the slots 40 and is retained on the bolts 47 by means of a spring 56 maintained in place on each bolt 47 by a nut 57 on the threaded outer end of each bolt 47.

The spring loaded locking means 46 maintain the width W between the first and second walls 31.41 of the bucket until such time as it is desired to alter the width W to accommodate a change of article width to be carried in the bucket on the conveyor. The change of width is simply accomplished by lifting, or rocking, the second wall member 40 so that the serrations 44 clear the serrations 38 (the springs 56 being compressed to permit flange 42 to be lifted clear of the base 30) and then the second wall member 40 is simply moved backwards or forwards along the base with the rods 48 sliding in the slots 39, longitudinally of the conveyor to provide the desired width W of the bucket.

In order to assist the setting of the bucket width, measuring indicia 60 are provided on the upper surface of the base 36 and a pointer 61 is provided on the flange 42 so that a visual representation of bucket width is provided to the operator. Once the required setting has been achieved the second wall member 40 is simply released to settle back with its serrations 44 once again firmly engaging in the serrations 38, the clamping bar 55 under the influence of the spring 56 on each of the rods 47 clamping the second wall member 40 firmly in place on the base.

In the device shown the second wall member is provided with a lip 62 and this together with lip 33 permits ease of handling during width adjustment of the bucket.

It will be understood that the slot 39 could terminate in a key-way and the rod 47 and its spring 56 could be arranged within the slot to accommodate the lifting of the serrations 44 out of the serrations 38 for width adjustment, or indeed other forms of a spring loading locking means could be provided to accommodate the nature of the operation.

It will be further understood that a single rod 47 cooperating with a single slot 39 could be employed, or equally well, that more than two rods 47 and slots 39 could be used, depending upon the configuration desired. Similarly, the clamping bar 55 in the embodiment shown in the drawings could be made up of two individual clamping bars one to cooperate with each slot.

What I claim as my invention is:

1. In a conveyor bucket having a base member, a first wall member upstanding of said base member and a second wall member movable on the base member, relative to the first wall member, to vary the distance between first and second wall members, whereby to vary the width of the bucket, the improvement comprising a serrated section on an upper face of said base member; a correspondingly serrated mating section on an underface of said second wall member, and a spring loaded locking means for releasably retaining said serrated sections in interlocking engagement at a desired bucket width.

2. A device as claimed in claim 1 in which said base member is slotted in the vicinity of its serrated section, said locking means comprising means protruding underneath said second wall member into the slot and spring loaded base member engaging means for clamping said protruding means to said base member.

3. A device as claimed in claim 2 in which said protruding means comprises a rod extending from said second wall member and through said slot and carrying a clamping bar extending across the underside of said slot, and spring means for urging said clamping bar into engagement with an underface of said base, to clamp said second wall member thereto and provide said spring loaded base member engaging means.

4. A device as claimed in claim 2 in which said second wall means is of substantially 'L'-shaped configuration, the upstanding web of which forms a wall of said bucket and the flange of which carries its serrated section on its underface.

5. A device as claimed in claim 4 in which the protruding means comprises a rod extending from the underface of said flange through said slot and carrying a clamping bar extending across the underside of said slot, said rod having a threaded outer end and an engaging nut thereon retaining a spring against an underside of said clamping bar to provide said spring loaded base member engaging means.

6. A device as claimed in claim 4 in which measuring indicia are provided on said upper face of said base member, and cooperating pointer means is provided on said flange, whereby to provide a visual representation of bucket width.

7. A device as claimed in claim 6 in which said indicia are positioned the said upper face of said base member.

8. A device as claimed in claim 3 or claim 5 in which a plurality of rods and cooperating slots are provided.

9. A device as claimed in claim 7 in which a single clamping rod is provided spanning all the slots.

* * * * *